US011588713B2

(12) United States Patent
Takano et al.

(10) Patent No.: US 11,588,713 B2
(45) Date of Patent: Feb. 21, 2023

(54) VIRTUAL NETWORK MONITORING SYSTEM, VIRTUAL NETWORK MONITORING APPARATUS, VIRTUAL NETWORK MONITORING METHOD, AND NON-TRANSITORY COMPUTER-READABLE RECORDING MEDIUM

(71) Applicant: NTT Advanced Technology Corporation, Kawasaki (JP)

(72) Inventors: Yuki Takano, Kawasaki (JP); Tomokazu Tachibana, Kawasaki (JP); Masatsugu Fukuda, Kawasaki (JP)

(73) Assignee: NTT Advanced Technology Corporation, Kawasaki (JP)

( * ) Notice: Subject to any disclaimer, the term of this patent is extended or adjusted under 35 U.S.C. 154(b) by 159 days.

(21) Appl. No.: 16/709,601

(22) Filed: Dec. 10, 2019

(65) Prior Publication Data

US 2021/0176149 A1    Jun. 10, 2021

(51) Int. Cl.
*H04L 12/26* (2006.01)
*H04L 43/08* (2022.01)
(Continued)

(52) U.S. Cl.
CPC .......... *H04L 43/08* (2013.01); *G06F 9/45558* (2013.01); *H04L 12/4641* (2013.01);
(Continued)

(58) Field of Classification Search
CPC ..... H04L 43/08; H04L 12/4641; H04L 49/70; H04L 41/5009; H04L 12/462;
(Continued)

(56) References Cited

U.S. PATENT DOCUMENTS

2004/0249916 A1    12/2004    Graves et al.
2014/0098671 A1*    4/2014    Raleigh ................ H04M 15/82
                                                                    370/235
(Continued)

FOREIGN PATENT DOCUMENTS

AU    2012340331 A1 *    6/2014    ............. G06F 15/16
JP    2009105716 A    5/2009
(Continued)

OTHER PUBLICATIONS

Canadian Office Action from counterpart CA3064541, dated Feb. 18, 2021.
Japanese Office Action from counterpart JP2018117364, dated Oct. 5, 2021.

*Primary Examiner* — Thai D Hoang
(74) *Attorney, Agent, or Firm* — Harness, Dickey & Pierce, P.L.C.

(57) ABSTRACT

A virtual network monitoring apparatus includes an acquisition unit configured to acquire first network information, the first network information being network information possessed by a virtual machine control unit functioning as an orchestrator, and second network information, the second network information being network information possessed by a virtual machine generated by the virtual machine control unit among network information on a virtual network to which the virtual machine is connected, and a generation unit configured to generate a traffic filter indicating a filter for traffic flowing through the virtual network on the basis of the first network information and the second network information.

4 Claims, 9 Drawing Sheets

(51) Int. Cl.
*H04L 12/46* (2006.01)
*G06F 9/455* (2018.01)
*H04L 49/00* (2022.01)

(52) U.S. Cl.
CPC .... *H04L 49/70* (2013.01); *G06F 2009/45591* (2013.01); *G06F 2009/45595* (2013.01)

(58) Field of Classification Search
CPC .......... H04L 12/4633; H04L 29/06612; H04L 43/20; H04L 45/66; H04L 2012/4629; H04L 43/062; H04L 43/028; G06F 9/45558; G06F 2009/45591; G06F 2009/45595; G06F 11/30; G06F 11/36; G06F 2009/45562; G06F 2009/45575
See application file for complete search history.

(56) References Cited

U.S. PATENT DOCUMENTS

| | | |
|---|---|---|
| 2014/0281030 A1 | 9/2014 | Cui et al. |
| 2017/0118102 A1* | 4/2017 | Majumder ............... H04L 43/20 |
| 2017/0141974 A1 | 5/2017 | Lahiri |
| 2017/0163510 A1* | 6/2017 | Arora .................... H04L 43/026 |

FOREIGN PATENT DOCUMENTS

| | | |
|---|---|---|
| JP | 2016006608 A | 1/2016 |
| JP | 2016054419 A | 4/2016 |
| JP | 2017005449 A | 1/2017 |
| JP | 2018-074511 A | 5/2018 |
| WO | WO-2006117831 A1 | 11/2006 |

\* cited by examiner

FIG. 5

| IDENTIFICATION DATA | RX TRAFFIC | TX TRAFFIC |
|---|---|---|
| SOURCE MAC ADDRESS | (L3 OPPOSITE IF) | MAC #1 |
| DESTINATION MAC ADDRESS | MAC #1 | (L3 OPPOSITE IF) |
| ETHERTYPE | IPv4 (0x800)<br>IPv6 (0x86DD)<br>VLAN (0x8100)<br>MPLS, ETC. | IPv4 (0x800)<br>IPv6 (0x86DD)<br>VLAN (0x8100)<br>MPLS, ETC. |
| PROTOCOL NUMBER | TCP<br>UDP<br>ICMP | TCP<br>UDP<br>ICMP |
| SOURCE IP ADDRESS | (SENDING HOST IP) | IP #1 |
| DESTINATION IP ADDRESS | IP #1 | (SENDING HOST IP) |
| SOURCE PORT NUMBER | (ANY) | (ANY) |
| DESTINATION PORT NUMBER | (ANY) | (ANY) |

VIRTUAL NETWORK MONITORING SYSTEM, VIRTUAL NETWORK MONITORING APPARATUS, VIRTUAL NETWORK MONITORING METHOD, AND NON-TRANSITORY COMPUTER-READABLE RECORDING MEDIUM

BACKGROUND OF THE INVENTION

Field of the Invention

The present invention relates to a virtual network monitoring system, a virtual network monitoring apparatus, a virtual network monitoring method, and a non-transitory computer-readable recording medium.

Description of Related Art

Conventionally, in a virtualization technology for a network, such as a network function virtualization (NFV) or a software-defined network (SDN), a monitoring function for ensuring normality of a generated virtual network is required. There is a method for acquiring traffic flowing through a virtual network to which a virtual machine is connected and monitoring the virtual network in order to improve security of the virtual network. The method for monitoring the virtual network includes a method for performing mirroring of a virtual network. A monitoring method using mirroring is a method for mirroring traffic of a virtual machine, analyzing the mirrored traffic, and monitoring a virtual network on the basis of analysis results.

Japanese Unexamined Patent Application, First Publication No. 2018-74511 (hereinafter referred to as "Patent Document 1") discloses a method for analyzing a mirroring packet on the basis of a time when mirroring has been performed. In Patent Document 1, a mirror packet obtained by mirroring a packet flowing through a network can be generated and analyzed on the basis of the time when the mirroring has been performed.

However, the monitoring method using mirroring has a problem in that, when a mirroring process is performed by a monitoring apparatus and a virtual machine that are installed in the same casing, a load is applied to a central processing unit (CPU) and/or memory, which affects an operation of the virtual machine. Therefore, a technique for acquiring traffic from a virtual switch that is used when the virtual machine performs communication using an external apparatus and monitoring a virtual network is generally used. A monitoring method using an external apparatus is a method for causing traffic to branch to the external apparatus using a distributor, such as a TAP or a splitter, and monitoring a virtual network on the basis of traffic acquired by the external apparatus.

SUMMARY OF THE INVENTION

However, a virtual machine and a virtual network are dynamically generated in response to receiving an instruction from a virtual machine control apparatus such as an orchestrator. Therefore, the monitoring method using an external apparatus has a problem in that content of the traffic cannot be identified although the traffic flowing through the virtual network can be acquired.

In view of the above circumstances, an object of the present invention is to provide a virtual network monitoring system, a virtual network monitoring apparatus, a virtual network monitoring method, and a non-transitory computer-readable recording medium capable of generating a traffic filter for identifying content of traffic flowing through a virtual network in monitoring of the virtual network using an external apparatus.

An aspect of the present invention is a virtual network monitoring apparatus including: an acquisition unit configured to acquire first network information, the first network information being network information possessed by a virtual machine control unit functioning as an orchestrator, and second network information, the second network information being network information possessed by a virtual machine generated by the virtual machine control unit among network information on a virtual network to which the virtual machine is connected; and a generation unit configured to generate a traffic filter indicating a filter for traffic flowing through the virtual network on the basis of the first network information and the second network information.

The above virtual network monitoring apparatus may further include a determination unit configured to determine whether or not the virtual network has been constructed normally on the basis of the first network information and the second network information.

The above virtual network monitoring apparatus may further include an identification unit configured to identify the traffic on the basis of the traffic filter, and the determination unit may determine whether or not the virtual network is operating normally on the basis of the identified traffic and the traffic filter.

The above virtual network monitoring apparatus may further include a warning unit configured to perform a warning to a user on the basis of a determination result of the determination unit, and the warning unit may perform the warning to the user when the determination unit determines that the virtual network is not operating normally.

An aspect of the present invention is a virtual network monitoring system including: an acquisition unit configured to acquire first network information, the first network information being network information possessed by a virtual machine control unit functioning as an orchestrator, and second network information, the second network information being network information possessed by a virtual machine generated by the virtual machine control unit among network information on a virtual network to which the virtual machine is connected; and a generation unit configured to generate a traffic filter indicating a filter for traffic flowing through the virtual network on the basis of the first network information and the second network information.

An aspect of the present invention is a virtual network monitoring method including: an acquisition step of acquiring, by one or a plurality of information processing apparatuses, first network information, the first network information being network information possessed by a virtual machine control unit functioning as an orchestrator, and second network information, the second network information being network information possessed by a virtual machine generated by the virtual machine control unit among network information on a virtual network to which the virtual machine is connected; and a generation step of generating, by the one or plurality of information processing apparatuses, a traffic filter indicating a filter for traffic flowing through the virtual network on the basis of the first network information and the second network information.

An aspect of the present invention is a non-transitory computer-readable recording medium having a computer program recorded thereon, the computer program causing a computer to function as the above virtual network monitoring apparatus.

According to the present invention, it is possible to identify the content of the traffic flowing through the virtual network in monitoring of the virtual network using the external apparatus.

BRIEF DESCRIPTION OF THE DRAWINGS

FIG. 5 is a diagram illustrating a specific example of identified data according to each embodiment.

DETAILED DESCRIPTION OF THE INVENTION

Hereinafter, embodiments of the present invention will be described with reference to the drawings.

First Embodiment

Figure 1:
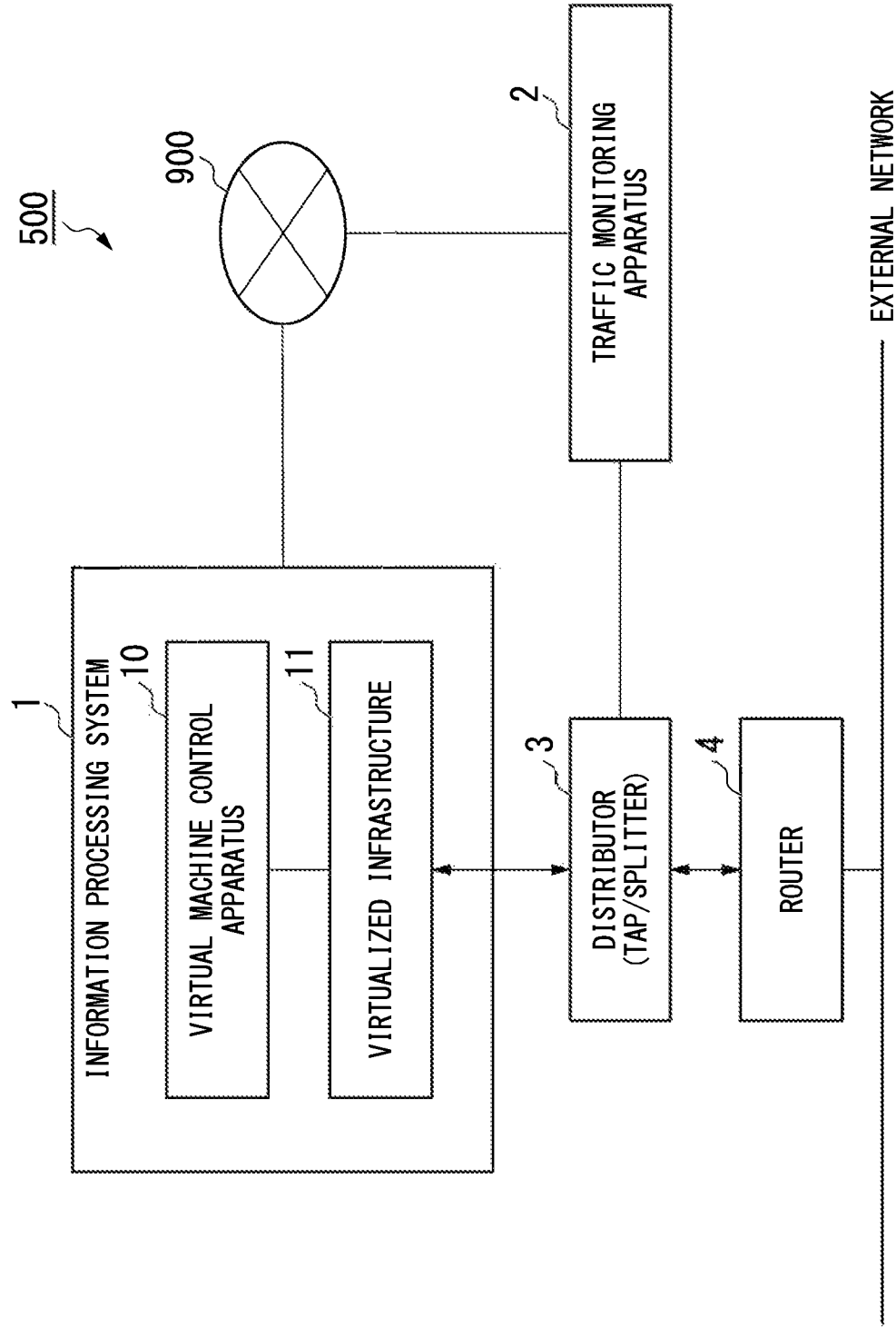
FIG. 1 is a diagram illustrating an example of an overall configuration of a virtual network monitoring system 500 according to a first embodiment.

FIG. 1 is a diagram illustrating an example of an overall configuration of a virtual network monitoring system 500 according to a first embodiment. The virtual network monitoring system 500 includes an information processing system 1, a traffic monitoring apparatus 2, a distributor 3, and a router 4.

An overview of the apparatuses included in the virtual network monitoring system 500 will be described.

The information processing system 1 includes a virtual machine control apparatus 10 and a virtualized infrastructure 11. The information processing system 1 operates a virtual machine by operating the virtual machine control apparatus 10 and the virtualized infrastructure 11.

The traffic monitoring apparatus 2 acquires information on a virtual network from the information processing system 1 via a network 900. The traffic monitoring apparatus 2 identifies traffic that is acquired from the distributor 3 on the basis of the acquired information on the virtual network. The traffic monitoring apparatus 2 monitors the virtual network on the basis of a filter generated from the identified traffic (hereinafter referred to as a "traffic filter").

The distributor 3 is an apparatus that distributes traffic, such as a TAP or a splitter. The traffic is a signal and data that are transmitted and received on a communication line and/or a network. The distributor 3 transmits traffic flowing through a communication interface (IF) 130 (to be described below) of the virtualized infrastructure 11 in the information processing system 1 to the traffic monitoring apparatus 2.

The router 4 is connected to an external network. An information processing apparatus performs communication with another information processing apparatus and a virtual machine 150 (to be described below) of the virtualized infrastructure 11 via the router 4.

In the following description, a specific example of the virtual network monitoring system 500 will be described using the configuration of FIG. 1.

Figure 2:
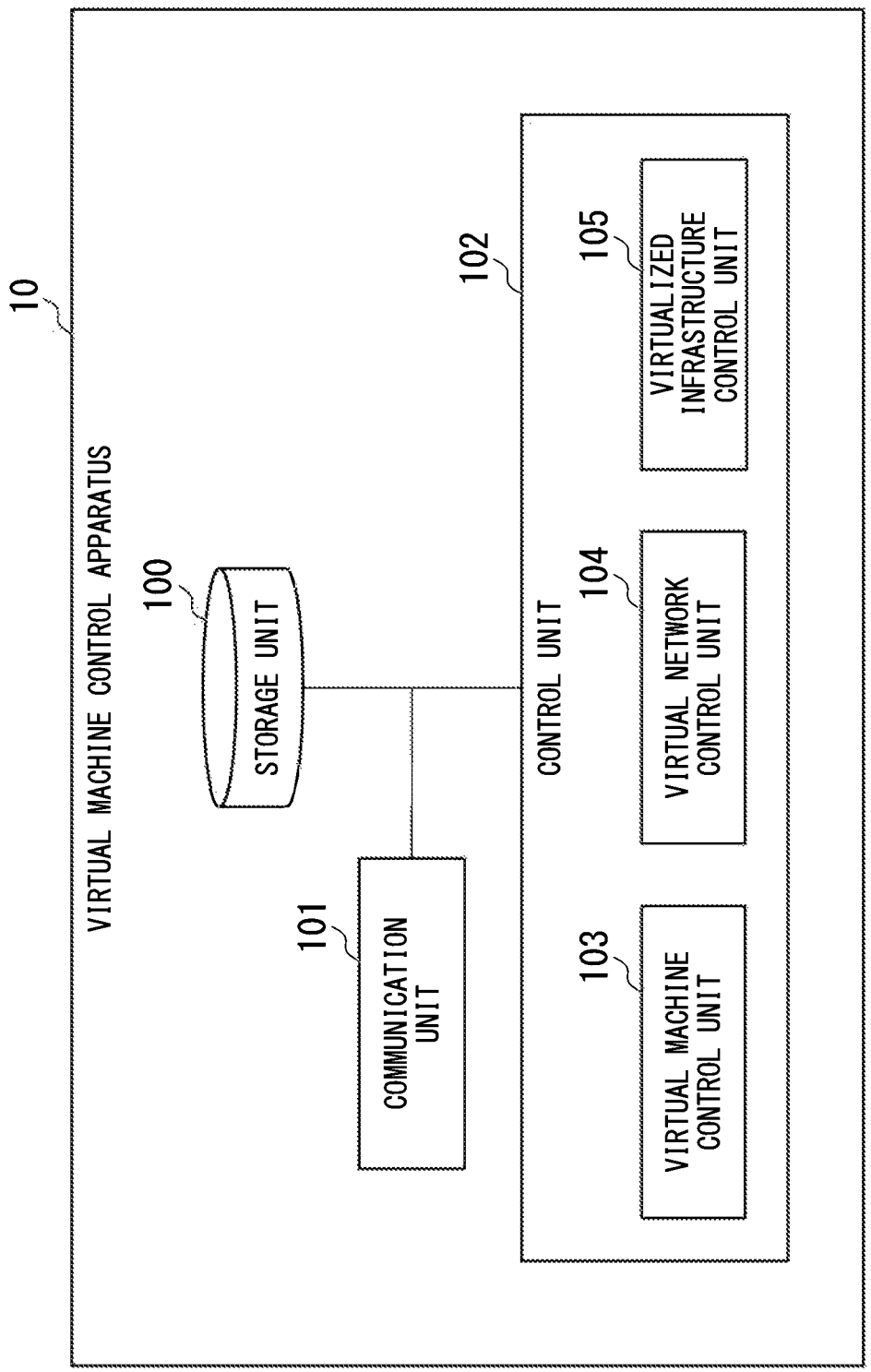
FIG. 2 is a functional block diagram illustrating a specific example of a virtual machine control apparatus 10 according to each embodiment.

FIG. 2 is a functional block diagram illustrating a specific example of the virtual machine control apparatus 10 according to each embodiment. The virtual machine control apparatus 10 includes a storage unit 100, a communication unit 101, and a control unit 102.

The virtual machine control apparatus 10 controls the virtualized infrastructure 11. In the present embodiment, an NFV management and network orchestration (NFV MANO) when an NFV architecture is configured in the information processing system 1 will be described as an example of the virtual machine control apparatus 10. The NFV MANO integrally controls an NFV infrastructure (NFVI), a virtual network function (VNF), and a network service composed of a plurality of VNFs.

The storage unit 100 is configured using a storage apparatus such as a magnetic hard disk apparatus and/or a semiconductor storage apparatus. The storage unit 100 stores, as first network information, information on the virtual network to which the virtual machine 150 is connected, which has been determined by a virtual network control unit 104. The first network information is network information possessed by the virtual machine control apparatus 10 among a plurality of pieces of network information on the virtual network to which the virtual machine 150 is connected that are generated by the virtual machine control apparatus 10. For example, the first network information is network information including an Internet protocol (IP) address or a media access control (MAC) address, design information on a virtual path, or the like, which is indicated to the virtual machine 150 by the virtual network control unit 104. For example, the first network information is information indicating a tunneling protocol constituting a network such as a virtual local area network (VLAN) or a virtual extensible local area network (VXLAN). The storage unit 100 stores programs of applications that operate in the virtual machine control apparatus 10 and data. It is to be noted that the storage unit 100 may further store other information.

The communication unit 101 is a communication interface. The communication unit 101 performs data communication with the traffic monitoring apparatus 2 via the network 900. The communication unit 101 sends the first network information to the traffic monitoring apparatus 2.

The control unit 102 is configured using a processor such as a CPU. The control unit 102 functions as a virtual machine control unit 103, the virtual network control unit 104, and a virtualized infrastructure control unit 105 by the processor executing a program.

Some or all of these components may be realized by hardware (including a circuitry) such as a large scale integration (LSI), an application specific integrated circuit (ASIC), a field-programmable gate array (FPGA), and/or a graphics processing unit (GPU), or may be realized by software and hardware in cooperation. The program may be stored in a storage apparatus, such as a hard disk drive (HDD) or a flash memory, in advance. Alternatively, the program may be stored in a detachable storage medium such as a digital versatile disc (DVD) or a compact disc-read only memory (CD-ROM), and installed by the storage medium being mounted in a drive apparatus.

The virtual machine control unit 103 controls the virtual machine 150. For example, in the present embodiment, the virtual machine control unit 103 functions as an NFV orchestrator (NFVO). The virtual machine control unit 103 as an orchestrator sends an instruction for generating the virtual machine 150 to a control unit 120 (to be described below) of the virtualized infrastructure 11. For example, the virtual machine control unit 103 sends a VNF constituted by a plurality of instances to the control unit 120 as a template for generating the virtual machine 150. The orchestrator of the virtual machine control unit 103 is software that provides, as a template, instances constituting a virtual machine, such as a configuration or settings necessary for starting up the virtual machine, a configuration of a virtual network connected to the virtual machine, a configuration of a firewall necessary for ensuring security, and a configuration of a load balancer necessary for load balancing. The virtual machine control unit 103 manages (e.g., generates, monitors, operate, or delete) a virtual network service composed of a plurality of VNFs to be responsible for integrally managing the entire system.

The virtual network control unit 104 controls a virtual network of the virtualized infrastructure 11. For example, in the present embodiment, the virtual network control unit 104 functions as a virtual network functions manager (VNFM). The virtual network control unit 104 sets information on the virtual network to which the virtual machine 150 is connected, and controls the virtual network of the virtualized infrastructure 11. Moreover, the virtual network control unit 104 stores the information on the virtual network to which the virtual machine 150 is connected, in the storage unit 100.

The virtualized infrastructure control unit 105 controls the virtualized infrastructure 11. For example, in the present embodiment, the virtualized infrastructure control unit 105 functions as a virtualized infrastructure manager (VIM). For example, the virtualized infrastructure control unit 105 is responsible for managing an infrastructure system of the virtualized infrastructure 11 having physical and virtual resources.

As described above, the virtual machine control apparatus 10 includes the virtual machine control unit 103, the virtual network control unit 104, and the virtualized infrastructure control unit 105, thereby making it possible to automate activation of the VNF, software setting, and the like, and perform construction of services, flexible change of facilities, automatic recovery at the time of failure, and the like.

Figure 3:
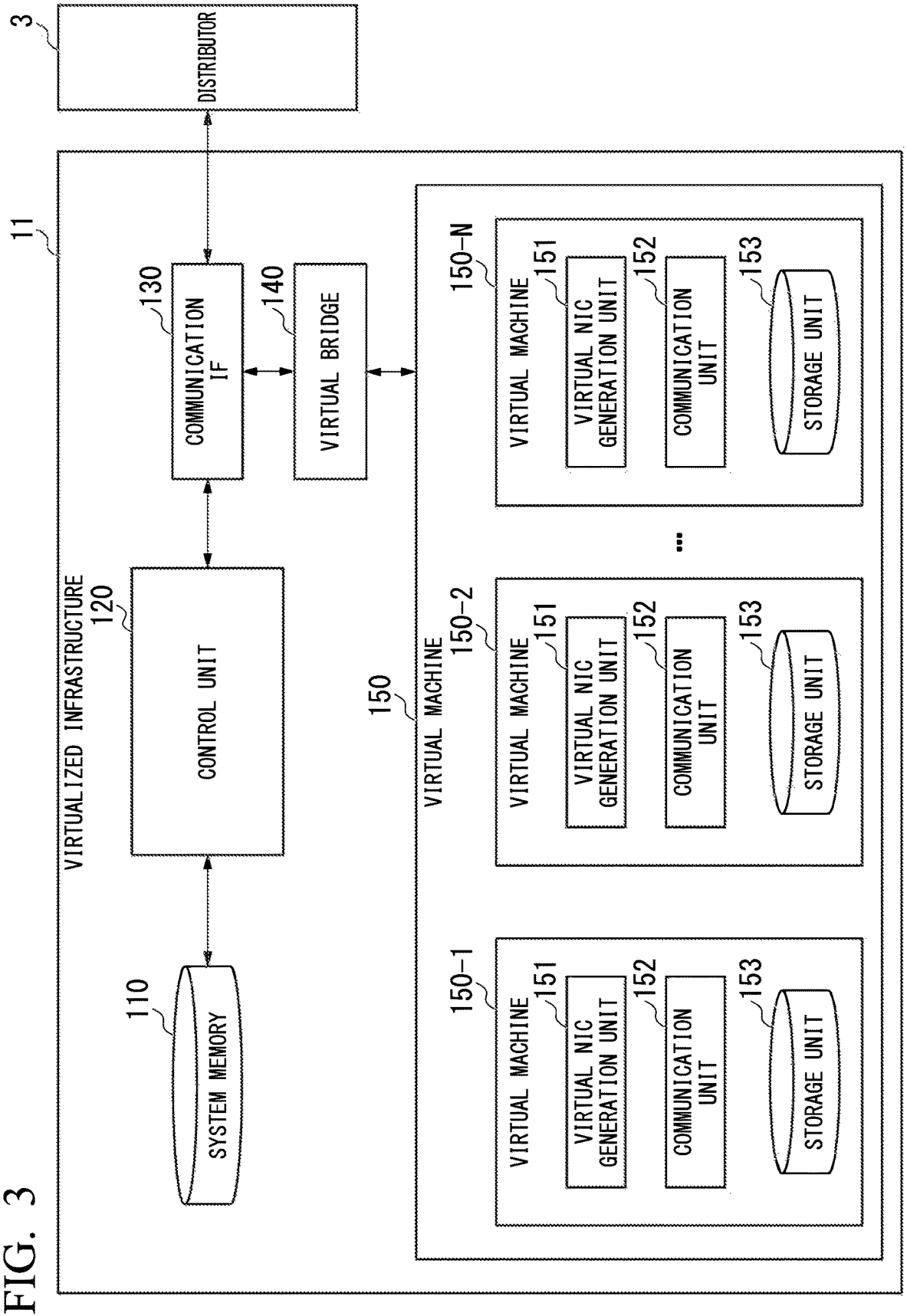
FIG. 3 is a functional block diagram illustrating a specific example of a virtualized infrastructure 11 according to each embodiment.

FIG. 3 is a functional block diagram illustrating a specific example of the virtualized infrastructure 11 according to each embodiment. The virtualized infrastructure 11 includes a system memory 110, the control unit 120, the communication interface 130, a virtual bridge 140, and the virtual machine 150. The virtualized infrastructure 11 includes physical resources for executing the VNF and is an infrastructure for executing a virtual machine having a virtualization function. For example, the virtualized infrastructure 11 is an NFVI. The NFVI includes hardware resources indicating a storage of an Intel Architecture (IA) server, an x86 server, or the like, and a hypervisor for virtualization.

The system memory 110 is configured using a storage apparatus such as a magnetic hard disk apparatus or a semiconductor storage apparatus. The system memory 110 stores the information on the virtual network to which the virtual machine 150 is connected, as second network information. The second network information is network information possessed by the virtual machine among the plurality pieces of network information on the virtual network to which the virtual machine is connected that are generated by the virtual machine control apparatus 10. That is, the second network information is network information including an IP address or MAC address, setting information on a virtual path, and the like actually constructed by the virtual machine 150. The system memory 110 stores traffic flowing through a reception-side interface "RX" and a transmission-side interface "TX" of the communication interface 130. The system memory 110 may further store other information. It is to be noted that the system memory 110 is an aspect of a storage unit.

The control unit 120 is configured using a processor such as a CPU. The control unit 120 executes a process in accordance with a program by loading the program into a main memory and executing the program by the processor. In the present embodiment, the control unit 120 functions as a control unit that controls other functional units in FIG. 3 by executing the program. The control unit 120 functions as a hypervisor for operating the virtual machine 150.

Some or all of these components may be realized by hardware (including a circuitry) such as an LSI, an ASIC, an FPGA, and/or a GPU, or may be realized by software and hardware in cooperation. The program may be stored in a storage apparatus, such as an HDD or a flash memory, in advance. Alternatively, the program may be stored in a detachable storage medium such as a DVD or a CD-ROM, and installed by the storage medium being mounted in a drive apparatus.

The communication interface 130 is a physical interface for communication. The communication interface 130 performs data communication with the traffic monitoring apparatus 2 via the distributor 3. The communication interface 130 sends traffic at the time of input and traffic at the time of output to the traffic monitoring apparatus 2 when the information processing system 1 performs communication. For example, the communication interface 130 sends traffic to the traffic monitoring apparatus 2 using a reception-side interface as "RX" and a transmission-side interface as "TX". In the present embodiment, when traffic flows from the external network to the virtual machine 150, the communication interface 130 uses "RX". When traffic flows from the virtual machine 150 to the external network, the communication interface 130 uses "TX".

The virtual bridge 140 is a virtual switch for passing the traffic received from the communication interface 130 to the virtual machine 150. When there are a plurality of virtual machines, the virtual bridge 140 combines the plurality of virtual machines into the same virtual machine 150 by connecting the virtual machines on different networks through software processing. Accordingly, the virtual machines connected to the same virtual bridge 140 and the information processing apparatus connected to the external network can communicate with each other via the virtual bridge 140.

The virtual machine 150 is a generic term of a virtual information processing apparatus that is used when a plurality of computers or operating systems (OSs) are operated on a single computer (the virtualized infrastructure 11) or when software for another architecture is operated on a single computer.

In the example illustrated in FIG. 3, the number of virtual machines is N (N is an integer equal to or greater than 1). It is to be noted that in the following description, when virtual machines 150-1 to 150-N are not distinguished from each other, such as when matters common to the virtual machines 150-1 to 150-N are described, the virtual machines 150-1 to 150-N will be simply referred to as a virtual machine 150.

The virtual machine 150 constructs a virtual network instructed by the virtual network control unit 104. The virtual machine 150 connects to the virtual network to communicate with another virtual machine 150 or a computer. For example, when there are a plurality of virtual machines on the virtualized infrastructure 11, the virtual machine 150-1 can communicate with the other virtual machines 150-2 to 150-N, and a computer connected to the external network.

In communications between the virtual machines, a communication protocol for network communication such as transmission control protocol/internet protocol (TCP/IP) (hereinafter referred to as a "NW communication protocol") is used. When communication is performed using the NW communication protocol, the traffic is communicated through a step of attaching data for controlling communication. This is because data for controlling communication in each layer is attached on the basis of a data communication model of the NW communication protocol.

The virtual machine 150 includes a virtual network interface card (NIC) generation unit 151, a communication unit 152, and a storage unit 153. It is to be noted that the virtual machine 150 may include other functional units.

The virtual NIC generation unit 151 generates a virtual network card for adding a network function to the virtual machine 150. For example, the virtual NIC generation unit 151 generates a virtual NIC in the virtual machine 150. The virtual NIC generation unit 151 connects the virtual NIC generated in the virtual machine 150 to the virtual bridge 140. By connecting the virtual NIC to the virtual bridge 140, the virtual machine 150 can communicate with a computer on the external network via the communication interface 130.

The communication unit 152 is an interface for communication. The communication unit 152 provides data communication between the virtual NIC generated by the virtual NIC generation unit 151 and the communication interface 130. The communication unit 152 provides data communication between the virtual NIC generated by the virtual NIC generation unit 151 and the virtual bridge 140.

The storage unit 153 is a virtual storage. The storage unit 153 stores a program operating on the virtual machine 150. The storage unit 153 stores data that is processed by the virtual machine 150. It is to be noted that the storage unit 153 may further store other information.

Figure 4:
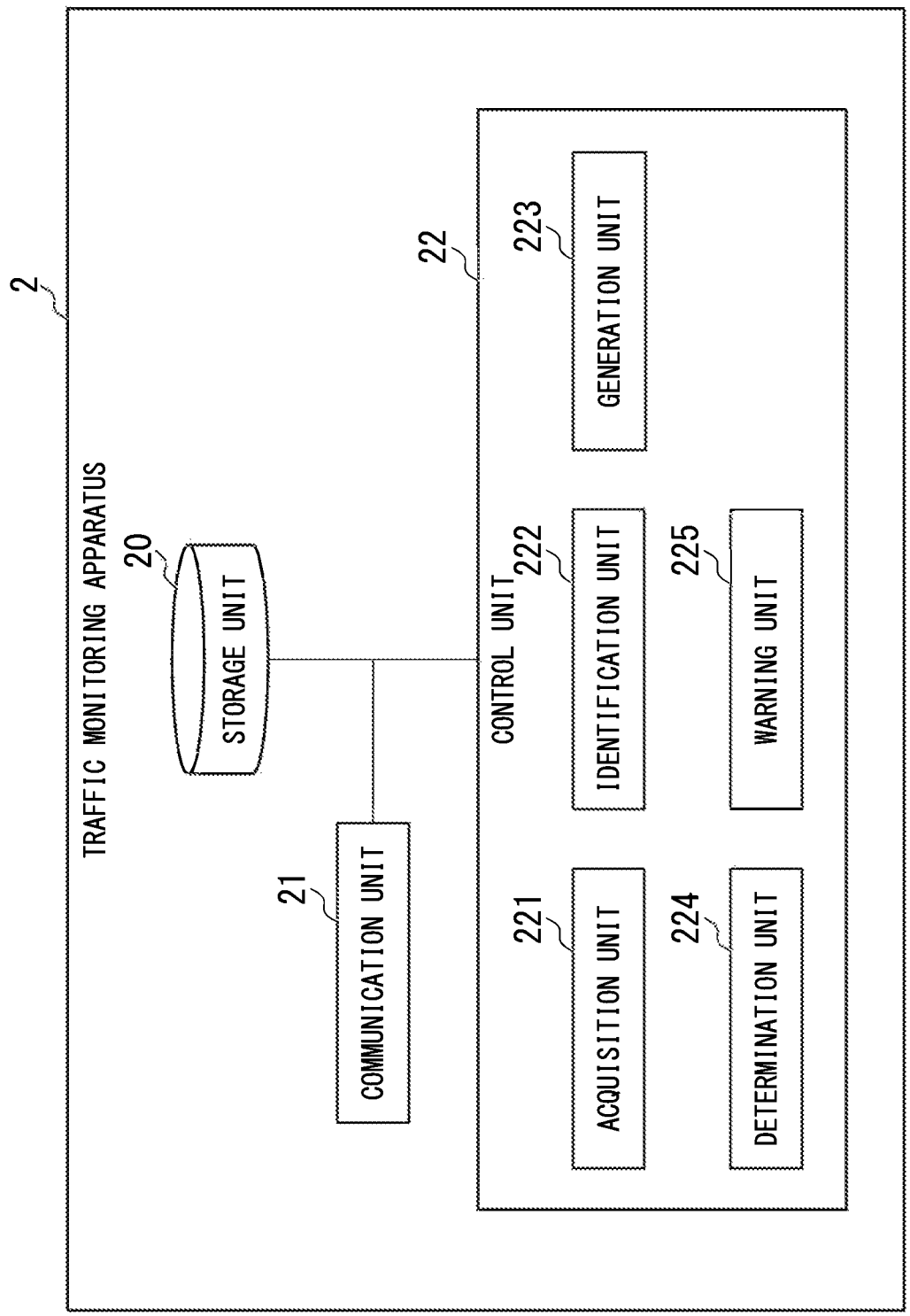
FIG. 4 is a functional block diagram illustrating a specific example of a traffic monitoring apparatus 2 according to each embodiment.

FIG. 4 is a functional block diagram illustrating a specific example of the traffic monitoring apparatus 2 according to each embodiment. The traffic monitoring apparatus 2 includes a storage unit 20, a communication unit 21, and a control unit 22.

The storage unit 20 is configured using a storage apparatus such as a magnetic hard disk apparatus or a semiconductor storage apparatus. The storage unit 20 stores programs of applications that operate in the traffic monitoring apparatus 2 and data. The storage unit 20 stores the traffic, the first network information, and the second network information acquired by an acquisition unit 221. The storage unit 20 stores data of traffic identified by an identification unit 222 (hereinafter referred to as "identified data"). The identified data indicates, for example, data of a header packet of the traffic. For example, the identified data is a transmission destination MAC address, a transmission destination IP address, or the like. The identified data will be described with reference to FIG. 5. The storage unit 20 stores information on a traffic filter generated by a generation unit 223. The storage unit 20 stores a determination result of a determination unit 224. It is to be noted that the storage unit 20 may further store other information.

The communication unit 21 is a communication interface. The communication unit 21 performs data communication with the information processing system 1 via the network 900. Moreover, the communication unit 21 receives the traffic from the distributor 3. The communication unit 21 sends the first network information and second network information received from the information processing system 1 and the traffic received from the distributor 3 to the control unit 22.

The control unit 22 is configured using a processor such as a CPU. The control unit 22 functions as the acquisition unit 221, the identification unit 222, the generation unit 223, the determination unit 224, and a warning unit 225 by the processor executing a program.

Some or all of these components may be realized by hardware (including a circuitry) such as an LSI, an ASIC, an FPGA, and/or a GPU, or may be realized by software and hardware in cooperation. The program may be stored in a storage apparatus, such as an HDD or a flash memory, in advance. Alternatively, the program may be stored in a detachable storage medium such as a DVD or a CD-ROM, and installed by the storage medium being mounted in a drive apparatus.

The acquisition unit 221 acquires the first network information possessed by the virtual machine control apparatus 10. The acquisition unit 221 acquires the second network information possessed by the virtualized infrastructure 11. The acquisition unit 221 acquires the traffic flowing through the virtual network from the distributor 3. The acquisition unit 221 stores the first network information, the second network information, and the traffic, which have been acquired, in the storage unit 20.

The identification unit 222 identifies content of data of the traffic. If the determination unit 224 determines that the first network information is the same as the second network information, the identification unit 222 identifies the content of the data of the traffic on the basis of a traffic filter to be described below. For example, the identification unit 222 identifies a packet length of traffic flowing through RX and TX. Moreover, for example, the identification unit 222 identifies header information of the traffic flowing through RX and TX. The identification unit 222 identifies an Ethertype of a tunneling protocol or the like, and extracts bits at a location at which the determination unit 224 performs the determination.

Specific combinations of "L2 over L3" and "L2 encapsulation" will be described for the tunneling protocol identified by the identification unit 222. A combination of the tunneling protocol of "L2 over L3" is, for example, a pair of VXLAN and VLAN, a pair of multi-protocol label switching (MPLS) over general routing encapsulation (GRE) and VLAN, or a pair of GENEVE and VLAN. A combination of the tunneling protocol of "L2 encapsulation" is, for example, a pair of layer two tunneling protocol (L2TP) and VLAN, or a pair of Q-in-Q and VLAN. The identification unit 222 stores the identified traffic in the storage unit 20 as the identified data. Details of the identified data will be described with reference to FIG. 5.

FIG. 5 is a diagram illustrating a specific example of the identified data according to each embodiment.

FIG. 5 illustrates a specific example of identified data of traffic flowing when the virtual machine 150 performs communication. For example, in FIG. 5, the identified data includes a transmission source MAC address, a transmission destination MAC address, an Ethertype, a protocol number, a transmission source IP address, a transmission destination IP address, a transmission source port number, and a transmission destination port number. Traffic flowing through RX and TX is acquired via the distributor 3. As an example, FIG. 5 shows identified data when the virtual machine 150-1 has performed communication with an information processing apparatus connected to the external network (an opposite information processing apparatus) via an L3 switch (router).

The transmission source MAC address is a MAC address possessed by an apparatus that transmits traffic. For example, in FIG. 5, in the case of traffic flowing through RX, a MAC address of an interface possessed by the opposite information processing apparatus indicates the transmission source MAC address. In the case of traffic flowing through TX, a MAC address of an interface possessed by the virtual machine 150-1 indicates the transmission source MAC address.

The transmission destination MAC address is a MAC address of an apparatus that receives traffic. For example, in FIG. 5, in the case of traffic flowing through RX, the MAC address of the interface possessed by the virtual machine 150-1 indicates the transmission destination MAC address. In the case of traffic flowing through TX, the MAC address of the interface possessed by the opposite information processing apparatus indicates the transmission destination MAC address.

The Ethertype is an identifier indicating a type of NW communication protocol that is used in Ethernet (registered trademark). For example, in FIG. 5, an Ethertype of traffic flowing through RX or TX is, for example, IPv4, IPv6, MPLS, or VLAN. The protocol number is a number defined for each NW communication protocol. For example, in FIG. 5, a protocol number of traffic flowing through RX or TX is protocol number 1 of internet control message protocol (ICMP), protocol number 6 of TCP, or protocol number 17 of user datagram protocol (UDP).

The transmission source IP address is an IP address that is assigned to an apparatus that communicates via a network. For example, in FIG. 5, in the case of the traffic flowing through RX, the IP address of the opposite information processing apparatus indicates the transmission source IP address. In the case of the traffic flowing through TX, an IP address of the virtual machine 150-1 indicates the transmission source IP address.

The transmission destination IP address is an IP address that is assigned to an apparatus that communicates via a network. For example, in FIG. 5, in the case of the traffic flowing through RX, the IP address of the virtual machine 150-1 indicates the transmission destination IP address. In the case of the traffic flowing through TX, an IP address of the opposite information processing apparatus indicates the transmission destination IP address.

The transmission source port number and the transmission destination port number are numbers for specifying an application of a communication destination with which a computer performs communication. The transmission source port number and the transmission destination port number may be arbitrarily acquired.

Returning to the description of FIG. 4, the generation unit 223 generates a traffic filter on the basis of the first network information and the second network information. The traffic filter is a filter that is generated for extracting any traffic. For example, in the present embodiment, the generation unit 223 stores, in the storage unit 20, a rule table when the generation unit 223 generates the filter. The rule table is a data table that stores network information serving as a reference. For example, in the present embodiment, the rule table stores identified data as the transmission source MAC address, the transmission destination MAC address, the Ethertype, the protocol number, the transmission source IP address, the transmission destination IP address, the transmission source port number, and the transmission destination port number.

The determination unit 224 determines whether the first network information is the same as the second network information. If the first network information is the same as the second network information, the determination unit 224 determines that the virtual network has been constructed normally, and the generation unit 223 generates a rule table as a traffic filter. If the first network information is not the same as the second network information, the determination unit 224 determines that the virtual network has not been constructed normally, and the generation unit 223 does not generate a traffic filter.

The determination unit 224 determines whether or not the traffic flowing through the virtual network is normal on the basis of the traffic and the traffic filter. A state in which the traffic is normal indicates that the identified data of the traffic extracted by the identification unit 222 and the traffic filter (the rule table) are in the same state. If the traffic is normal, the determination unit 224 determines that the virtual network is operating normally. If the traffic is not normal, the determination unit 224 determines that the virtual network is not operating normally.

The warning unit 225 performs a warning to the user on the basis of a determination result of the determination unit 224. It is to be noted that the warning unit 225 may output a warning to the user through the information processing system 1 or may output a warning from the traffic monitoring apparatus 2.

Figure 6:
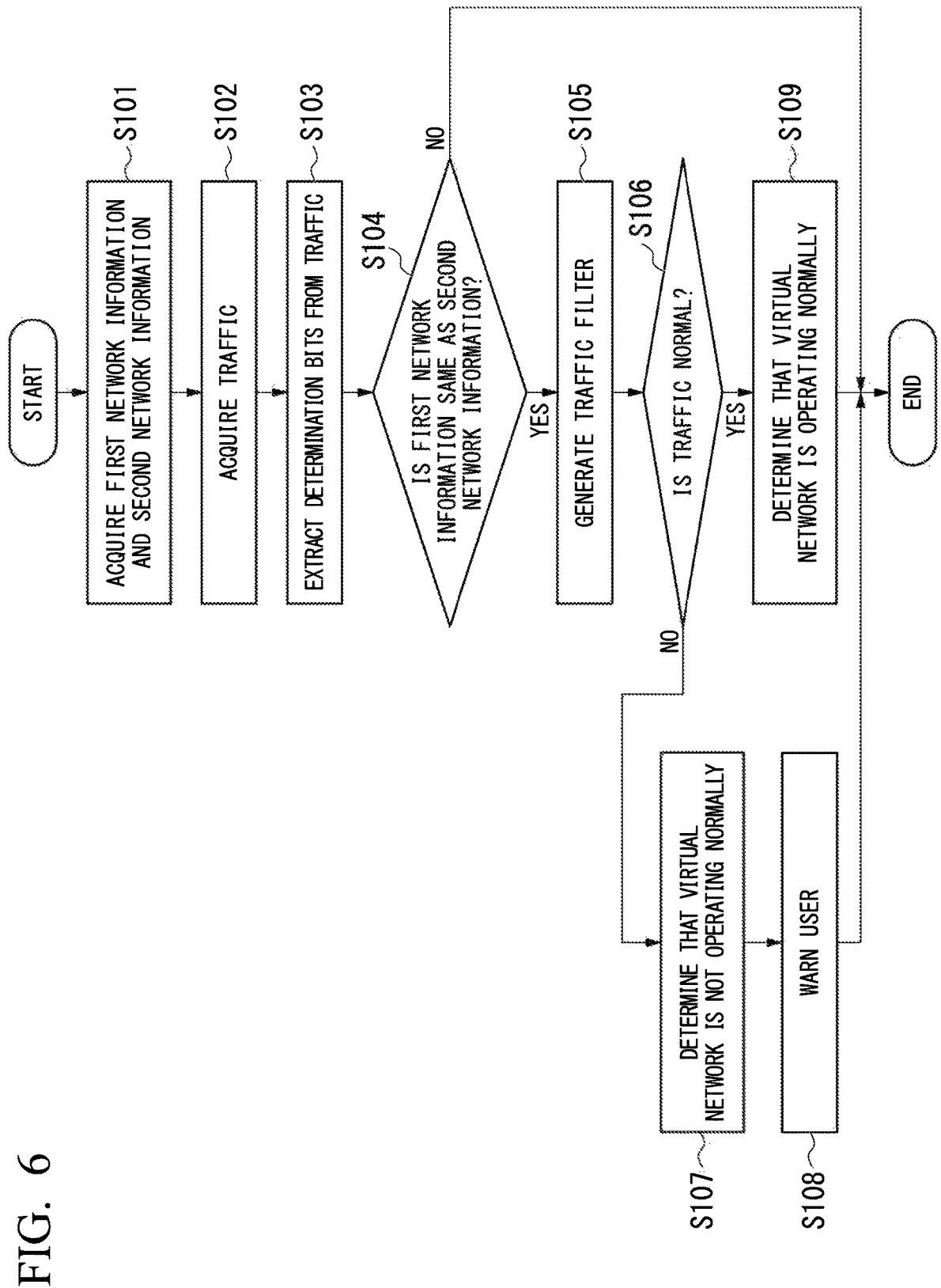
FIG. 6 is a flowchart illustrating a specific example of a process of the virtual network monitoring system 500 according to each embodiment.

FIG. 6 is a flowchart illustrating a specific example of a process of the virtual network monitoring system 500. The acquisition unit 221 acquires the first network information and the second network information from the virtual machine control apparatus 10 and the virtualized infrastructure 11 (step S101). The acquisition unit 221 acquires the traffic flowing through RX and TX from the distributor 3 (step S102). The identification unit 222 identifies the Ethertype, such as the tunneling protocol, from the traffic, and extracts bits at a location at which the determination unit 224 performs the determination (step S103).

The determination unit 224 determines whether or not the first network information is the same as the second network information (step S104). If the first network information is not the same as the second network information (step S104: NO), the determination unit 224 determines that the virtual network has not been constructed normally, and ends the processing. If the first network information is the same as the second network information (step S104: YES), the determination unit 224 determines that the virtual network has been constructed normally, and the generation unit 223 generates the rule table as a traffic filter (step S105).

The determination unit 224 determines whether or not the traffic flowing through the virtual network is normal on the basis of the traffic and the traffic filter (step S106). If the traffic is not normal (step S106: NO), the determination unit 224 determines that the virtual network is not operating normally (step S107). The warning unit 225 warns the user on the basis of a determination result of the determination unit 224 (step S108). If the traffic is normal (step S106: YES), the determination unit 224 determines that the virtual network is operating normally (step S109).

Figure 7:
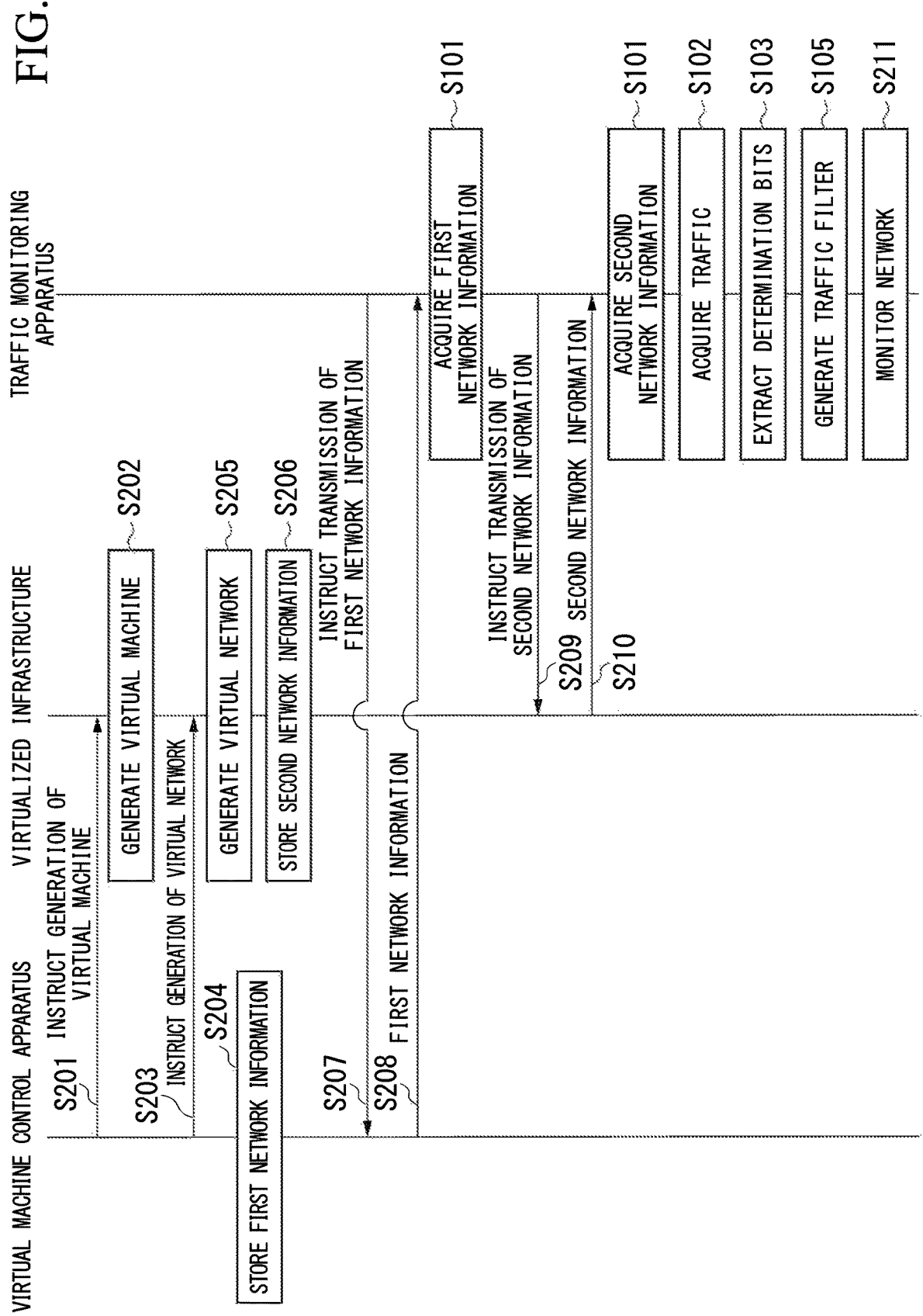
FIG. 7 is a sequence diagram illustrating a specific example of a process of the virtual network monitoring system 500 according to each embodiment.

FIG. 7 is a sequence diagram illustrating a specific example of a process of the virtual network monitoring system 500 according to each embodiment. It is to be noted that a description of the processes described with reference to FIG. 6 will be omitted.

The virtual machine control unit 103 sends an instruction to generate the virtual machine 150 (hereinafter referred to as a "virtual machine generation instruction") to the virtualized infrastructure 11 (step S201). The virtualized infrastructure 11 generates the virtual machine 150 on the basis of the virtual machine generation instruction (step S202). The virtual network control unit 104 sends an instruction to generate a virtual network (hereinafter referred to as a "virtual network generation instruction") to the virtualized infrastructure 11 (step S203). The virtual network control unit 104 stores content of data of the virtual network generation instruction in the storage unit 100 as the first network information (step S204).

The virtualized infrastructure 11 constructs the virtual network on the basis of the virtual network generation instruction (step S205). The virtualized infrastructure 11 stores information on the constructed virtual network as the second network information in the system memory 110 (step S206). The traffic monitoring apparatus 2 sends an instruction for acquiring the first network information (hereinafter referred to as a "first network information transmission instruction") to the virtual machine control apparatus 10 (step S207). The virtual machine control apparatus 10 sends the first network information to the traffic monitoring apparatus 2 on the basis of the first network information transmission instruction (step S208). Similarly, the traffic monitoring apparatus 2 sends an instruction for acquiring the second network information (hereinafter referred to as a "second network information transmission instruction") to the virtualized infrastructure 11 (step S209). The virtualized infrastructure 11 sends the second network information to the traffic monitoring apparatus 2 on the basis of the second network information transmission instruction (step S210).

The traffic monitoring apparatus 2 executes the processes of steps S101 to S103 and step S105. The traffic monitoring apparatus 2 monitors the virtual network (step S211). Specifically, a process of step S211 refers to the processes of steps S106 to S109.

The virtual network monitoring system 500 configured as described above includes the acquisition unit 221 and the generation unit 223, thereby, making it possible to generate the traffic filter for identifying normal traffic. The virtual network monitoring system 500 further includes the identification unit 222, thereby making it possible to identify the traffic flowing through RX and TX. Accordingly, the virtual network monitoring system 500 can generate the traffic filter for identifying the content of the traffic flowing through the virtual network in monitoring of the virtual network using the external apparatus.

Second Embodiment

Figure 8:
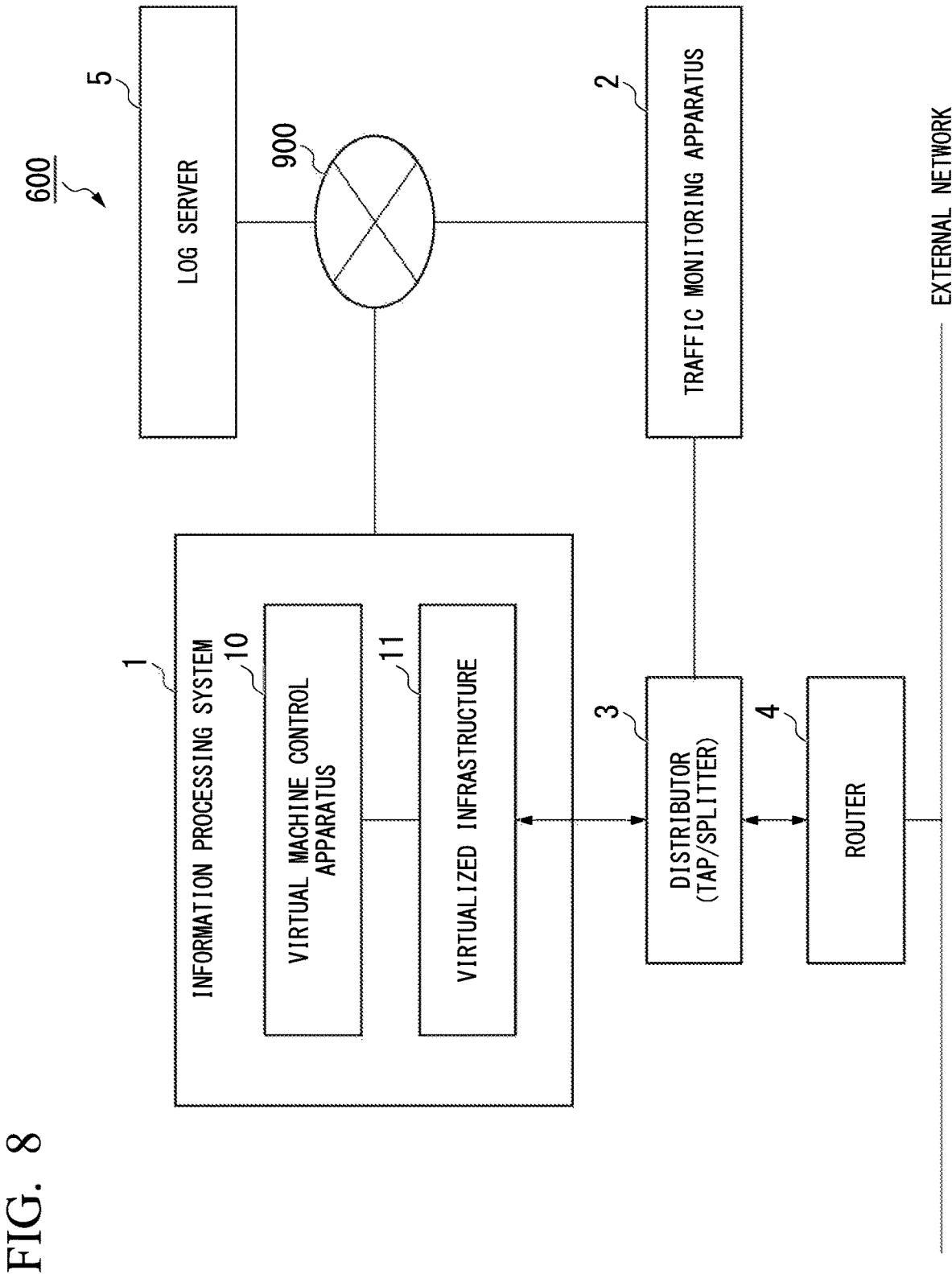
FIG. 8 is a diagram illustrating an example of an overall configuration of a virtual network monitoring system 600 according to a second embodiment.

FIG. 8 is a diagram illustrating an example of an overall configuration of a virtual network monitoring system 600 according to a second embodiment. It is to be noted that in the following description, a description of matters already described in the first embodiment may be omitted. Here, a description will focus on matters unique to the present embodiment.

The virtual network monitoring system 600 includes an information processing system 1, a traffic monitoring apparatus 2, a distributor 3, a router 4, and a log server 5.

The log server 5 acquires identified data from the traffic monitoring apparatus 2 via a network 900. The log server 5 renders a graph on the basis of the identified data acquired from the traffic monitoring apparatus 2.

Figure 9:
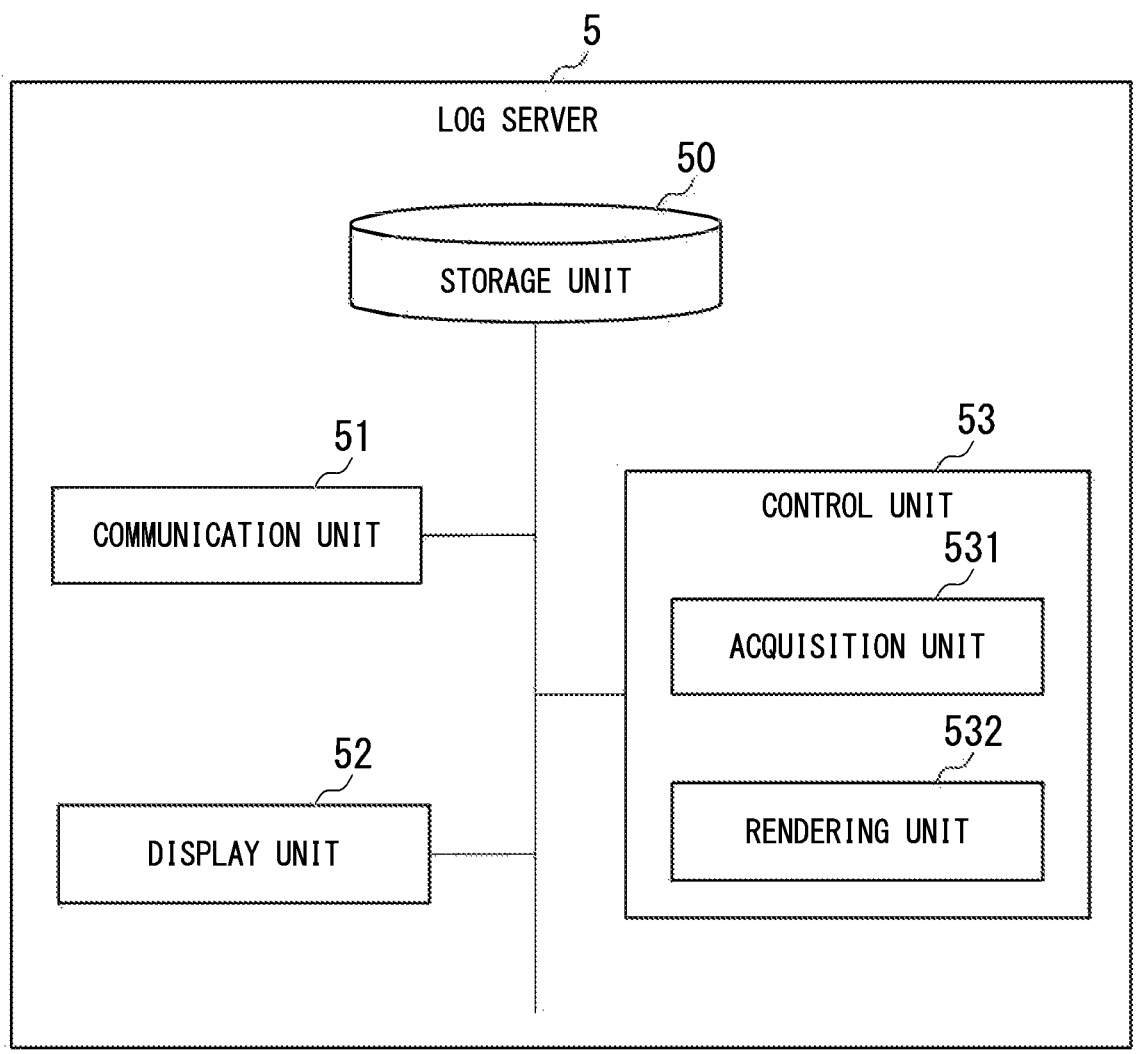
FIG. 9 is a functional block diagram illustrating a specific example of a log server 5 according to the second embodiment.

FIG. 9 is a functional block diagram illustrating a specific example of the log server 5 according to the second embodiment.

The log server 5 includes a storage unit 50, a communication unit 51, a display unit 52, and a control unit 53.

The storage unit 50 is configured using a storage apparatus such as a magnetic hard disk apparatus or a semiconductor storage apparatus. The storage unit 50 stores the identified data received from the traffic monitoring apparatus 2 as log data. It is to be noted that the storage unit 50 may store the first network information and the second network information. Moreover, the storage unit 50 may further store other information.

The communication unit 51 is a communication interface. The communication unit 51 performs data communication with the traffic monitoring apparatus 2 via the network 900.

The display unit 52 is an image display apparatus such as a cathode ray tube (CRT) display, a liquid crystal display, or an organic electro luminescence (EL) display. The display unit 52 displays a video signal that is received from a rendering unit 532. The display unit 52 may be an interface for connecting the image display apparatus to the log server 5. In this case, the display unit 52 generates a video signal for displaying text data or video data, and outputs the video signal to the image display apparatus connected to the display unit 52.

The control unit 53 is configured using a processor such as a CPU. The control unit 53 functions as an acquisition unit 531 and the rendering unit 532 by the processor executing a program.

Some or all of these components may be realized by hardware (including a circuitry) such as an LSI, an ASIC, an FPGA, and/or a GPU, or may be realized by software and hardware in cooperation. The program may be stored in a storage apparatus, such as an HDD or a flash memory, in advance. Alternatively, the program may be stored in a detachable storage medium such as a DVD or a CD-ROM, and installed by the storage medium being mounted in a drive apparatus.

The acquisition unit 531 acquires the identified data from the traffic monitoring apparatus 2. The acquisition unit 531 sends the acquired identified data to the storage unit 50 and the rendering unit 532. For example, the acquisition unit 531 may acquire the identified data using an application programming interface (API) for monitoring traffic.

The rendering unit 532 renders a graph on the basis of the identified data received from the acquisition unit 531. For example, the rendering unit 532 renders a graph of the identified data using a visualization application.

The virtual network monitoring system 600 configured as described above includes the acquisition unit 221, the identification unit 222, the generation unit 223, and the rendering unit 532, thereby making it possible to render data of the identified traffic on the basis of the traffic filter. Accordingly, the virtual network monitoring system 600 can generate the traffic filter for identifying the content of the traffic flowing through the virtual network and render the data of the identified traffic in the monitoring of the virtual network using the external apparatus.

Modification Examples

In FIG. 1, as an example, the virtual machine control apparatus 10 and the virtualized infrastructure 11 are caused to function in the same casing of the information processing system 1, but the virtual machine control apparatus 10 and the virtualized infrastructure 11 may function by communicating with each other via a network. The network may partially include, for example, a global network such as the Internet or a public wireless network, or may include a wide area network (WAN), a local area network (LAN), and/or a cellular network.

The virtual machine in the embodiments may be a host type or a hypervisor type. That is, operation schemes of virtual machines and the number of operating virtual machines do not matter as long as the virtual machines operate on the same host machine.

The information processing system 1 and the traffic monitoring apparatus 2 may include a display unit. The information processing system 1 and the traffic monitoring apparatus 2 may display the traffic, the first network information, and the second network information, which have been acquired, on the display unit.

The warning unit 225 may cause the traffic monitoring apparatus 2 to display a warning text or may output a sound such as a beep sound.

The rendering unit 532 may render the identified data on the basis of the log data stored in the storage unit 50.

The rendering unit 532 may acquire the identified data of the traffic from the identification unit 222 and render the identified data.

The identification unit 222 may identify an application to be used, on the basis of the port number.

The information processing system 1, the traffic monitoring apparatus 2, and the log server 5 may include an input unit. The input unit is configured using an existing input apparatus such as a keyboard, a pointing device (a mouse, a tablet, or the like), buttons, and a touch panel. The input unit is operated by a worker when an instruction from the worker is input to the information processing system 1, the traffic monitoring apparatus 2, and the log server 5. The input unit may be an interface for connecting the input apparatus to the information processing system 1, the traffic monitoring apparatus 2, and the log server 5. In this case, the input unit inputs an input signal generated in accordance with an input from the worker in the input apparatus to the information processing system 1, the traffic monitoring apparatus 2, and the log server 5.

If the first network information is not the same as the second network information, the warning unit 225 performs a warning to the user on the basis of a determination result of the determination unit 224. In this case, the generation unit 223 may generate a rule table as the traffic filter on the basis of the first network information and the second network information.

The virtual network monitoring system, the virtual network monitoring apparatus, and the virtual network monitoring method in the above-described embodiment may be realized by a computer. In this case, these may be realized by recording a program for realizing functions thereof on a computer-readable recording medium, loading the program recorded on the recording medium into a computer system, and executing the program. It is to be noted that the "computer system" referred to herein includes an OS and hardware such as peripheral devices. Moreover, the "computer-readable recording medium" refers to a portable medium such as a flexible disk, a magneto-optical disk, a ROM, or a CD-ROM, and a storage apparatus such as a hard disk built in the computer system. Furthermore, the "computer-readable recording medium" may include a medium that dynamically holds a program for a short time, such as a communication line when the program is transmitted via a network such as the Internet or a communication line such as a telephone line, or a medium that holds a program for a certain period of time, such as a volatile memory inside a computer system serving as a server or a client in that case. Additionally, the program may be a program for realizing some of the above-described functions, may be a program that can realize the above-described functions in combination with a program already recorded in the computer system, or may be a program that is realized using a programmable logic device such as an FPGA.

The embodiments of the present invention have been described above in detail with reference to the drawings, but a specific configuration is not limited to the embodiments, and the present invention includes a design or the like without departing from the gist of the present invention.

What is claimed is:

1. A virtual network monitoring apparatus, comprising:
an acquisition unit configured to acquire first network information, the first network information being network information possessed by a virtual machine control unit functioning as an orchestrator, and second network information, the second network information being network information possessed by a virtual machine generated by the virtual machine control unit among network information on a virtual network to which the virtual machine is connected, the first network information including an Internet protocol address, a media access control address, or design information on a virtual path, the first network information being indicated to the virtual machine by a virtual network control unit that controls the virtual network, the second network information including an Internet protocol address, a media access control address, or setting information on a virtual path, the second network information being actually constructed by the virtual machine;
a generation unit configured to generate a traffic filter indicating a filter for traffic flowing through the virtual network on the basis of the first network information and the second network information;
a determination unit configured to determine whether or not the virtual network has been constructed normally on the basis of whether or not the first network information is the same as the second network information; and
an identification unit configured to identify the traffic on the basis of the traffic filter, wherein the determination unit determines whether or not the virtual network is operating normally on the basis of the identified traffic and the traffic filter,
wherein when the determination unit determines that the first network information is the same as the second network information, the identification unit identifies content of data of the traffic on the basis of the traffic filter.

2. A virtual network monitoring apparatus, comprising:
an acquisition unit configured to acquire first network information, the first network information being network information possessed by a virtual machine control unit functioning as an orchestrator, and second network information, the second network information being network information possessed by a virtual machine generated by the virtual machine control unit among network information on a virtual network to which the virtual machine is connected, the first network information including an Internet protocol address, a media access control address, or design information on a virtual path, the first network information being indicated to the virtual machine by a virtual network control unit that controls the virtual network, the second network information including an Internet protocol address, a media access control address, or setting information on a virtual path, the second network information being actually constructed by the virtual machine;

a generation unit configured to generate a traffic filter indicating a filter for traffic flowing through the virtual network on the basis of the first network information and the second network information;

a determination unit configured to determine whether or not the virtual network has been constructed normally on the basis of whether or not the first network information is the same as the second network information; and an identification unit configured to identify the traffic on the basis of the traffic filter, wherein the determination unit determines whether or not the virtual network is operating normally on the basis of the identified traffic and the traffic filter, wherein the determination unit determines whether or not the traffic flowing through the virtual network is normal on the basis of the traffic and the traffic filter and determines that the virtual network is operating normally when the traffic flowing through the virtual network is normal, and a state in which the traffic flowing through the virtual network is normal indicates that identified data of the traffic extracted by the identification unit and the traffic filter are in a same state.

3. A non-transitory computer-readable medium having computer-executable instructions that, upon execution of the instructions by a processor of a computer, cause the computer to:

acquire first network information, the first network information being network information possessed by a virtual machine control unit functioning as an orchestrator, and second network information, the second network information being network information possessed by a virtual machine generated by the virtual machine control unit among network information on a virtual network to which the virtual machine is connected, the first network information including an Internet protocol address, a media access control address, or design information on a virtual path, the first network information being indicated to the virtual machine by a virtual network control unit that controls the virtual network, the second network information including an Internet protocol address, a media access control address, or setting information on a virtual path, the second network information being actually constructed by the virtual machine;

generate a traffic filter indicating a filter for traffic flowing through the virtual network on the basis of the first network information and the second network information;

determine whether or not the virtual network has been constructed normally on the basis of whether or not the first network information is the same as the second network information;

identify the traffic on the basis of the traffic filter;

determines whether or not the virtual network is operating normally on the basis of the identified traffic and the traffic filter; and identifies content of data of the traffic on the basis of the traffic filter in response to a determination that the first network information is the same as the second network information.

4. A non-transitory computer-readable medium having computer-executable instructions that, upon execution of the instructions by a processor of a computer, cause the computer to:

configured to acquire first network information, the first network information being network information possessed by a virtual machine control unit functioning as an orchestrator, and second network information, the second network information being network information possessed by a virtual machine generated by the virtual machine control unit among network information on a virtual network to which the virtual machine is connected, the first network information including an Internet protocol address, a media access control address, or design information on a virtual path, the first network information being indicated to the virtual machine by a virtual network control unit that controls the virtual network, the second network information including an Internet protocol address, a media access control address, or setting information on a virtual path, the second network information being actually constructed by the virtual machine;

generate a traffic filter indicating a filter for traffic flowing through the virtual network on the basis of the first network information and the second network information;

determine whether or not the virtual network has been constructed normally on the basis of whether or not the first network information is the same as the second network information;

identify the traffic on the basis of the traffic filter;

determines whether or not the virtual network is operating normally on the basis of the identified traffic and the traffic filter; and determines whether or not the traffic flowing through the virtual network is normal on the basis of the traffic and the traffic filter and determines that the virtual network is operating normally when the traffic flowing through the virtual network is normal, and a state in which the traffic flowing through the virtual network is normal indicates that identified data of the traffic and the traffic filter are in a same state.

* * * * *